US010990062B2

(12) United States Patent
Wang et al.

(10) Patent No.: US 10,990,062 B2
(45) Date of Patent: Apr. 27, 2021

(54) DISPLAY SYSTEM

(71) Applicants: BOE TECHNOLOGY GROUP CO., LTD., Beijing (CN); FUZHOU BOE OPTOELECTRONICS TECHNOLOGY CO., LTD., Fujian (CN)

(72) Inventors: Qiaoni Wang, Beijing (CN); Hui Chen, Beijing (CN); Shijian Luo, Beijing (CN); Yabin Lin, Beijing (CN); Xin Xie, Beijing (CN); Chunmei Yang, Beijing (CN); Xingming Chen, Beijing (CN); Zhijian Chen, Beijing (CN); Xinyu Zhang, Beijing (CN)

(73) Assignees: BOE TECHNOLOGY GROUP CO., LTD., Beijing (CN); FUZHOU BOE OPTOELECTRONICS TECHNOLOGY CO., LTD., Fujian (CN)

(*) Notice: Subject to any disclaimer, the term of this patent is extended or adjusted under 35 U.S.C. 154(b) by 122 days.

(21) Appl. No.: 16/135,746

(22) Filed: Sep. 19, 2018

(65) Prior Publication Data
US 2019/0086863 A1 Mar. 21, 2019

(30) Foreign Application Priority Data
Sep. 19, 2017 (CN) .......................... 201710852412.1

(51) Int. Cl.
*G03H 1/08* (2006.01)
*G03H 1/00* (2006.01)
(Continued)

(52) U.S. Cl.
CPC ......... *G03H 1/0005* (2013.01); *G03H 1/2294* (2013.01); *G06F 3/017* (2013.01);
(Continued)

(58) Field of Classification Search
CPC . G06F 3/01; G06F 3/012; G06F 3/013; G06F 3/017; G06F 3/0428; G06F 3/042;
(Continued)

(56) References Cited

U.S. PATENT DOCUMENTS

| | | | | |
|---|---|---|---|---|
| 8,723,789 B1 * | 5/2014 | Rafii | ....................... | G06F 3/017 345/156 |
| 2013/0215235 A1 * | 8/2013 | Russell | .................. | G03B 35/00 348/47 |

FOREIGN PATENT DOCUMENTS

| | | |
|---|---|---|
| CN | 103246351 A | 8/2013 |
| CN | 104697947 A | 6/2015 |

(Continued)

OTHER PUBLICATIONS

Chinese Office Action issued in corresponding Chinese Patent Application No. 201710852412.1, dated Apr. 29, 2019, with English translation.

*Primary Examiner* — Mustak Choudhury
(74) *Attorney, Agent, or Firm* — McDermott Will & Emery LLP

(57) ABSTRACT

A display system includes: a display screen having a first display area; a processor configured to modulate laser beams to be emitted from a laser projector according to a pre-stored holographic image data source to obtain modulated laser beams; the laser projector configured to project the modulated laser beams to create a first holographic image in front of the first display area; and at least one photodetector configured to collect first gesture information about a first gesture through which the first holographic image is controlled by a viewer. The processor is further configured to generate a first control signal according to the first gesture information, and re-modulate the laser beams to be emitted
(Continued)

from the laser projector, so as to create a second holographic image corresponding to the first control signal.

8 Claims, 2 Drawing Sheets

(51) Int. Cl.
*G03H 1/22* (2006.01)
*G06F 3/01* (2006.01)
*G06F 3/03* (2006.01)
*G06K 9/00* (2006.01)
*G03B 21/20* (2006.01)
*G02B 27/48* (2006.01)

(52) U.S. Cl.
CPC ............ *G06F 3/0304* (2013.01); *G02B 27/48* (2013.01); *G03B 21/204* (2013.01); *G03H 2001/0061* (2013.01); *G03H 2001/2252* (2013.01); *G06K 9/00355* (2013.01)

(58) Field of Classification Search
CPC .... G06F 3/0304; G06F 3/0487; G06F 3/0488; G06F 2203/04808; G03H 1/0005; G03H 1/22; G03H 1/2294; G03H 2001/0061; G03H 2001/2252; G09G 3/003–006; G06K 9/00355; G03B 21/204; G03B 35/00; G02B 26/106; G02B 27/0172; G02B 27/48; G02B 27/101; G01B 11/25; G01N 21/31; H04N 1/00381; G06T 19/006; G06T 7/00
See application file for complete search history.

(56) References Cited

FOREIGN PATENT DOCUMENTS

| | | |
|---|---|---|
| CN | 104699234 A | 6/2015 |
| CN | 104898394 A | 9/2015 |

\* cited by examiner

DISPLAY SYSTEM

CROSS-REFERENCE TO RELATED APPLICATION

This application claims priority to Chinese Patent Application No. 201710852412.1, filed on Sep. 19, 2017, titled "A DISPLAY SYSTEM", which is incorporated herein by reference in its entirety.

TECHNICAL FIELD

The present disclosure relates to the field of display technologies, and in particular, to a display system.

BACKGROUND

With the development of display technologies, traditional two-dimensional display has been unable to meet the increasing visual demand of the people.

SUMMARY

Some embodiments of the present disclosure provide a display system, and the display system includes: a display screen having a first display area; a processor configured to modulate a laser beam to be emitted from a laser projector according to a pre-stored holographic image data source to obtain a modulated laser beam; the laser projector configured to project the modulated laser beam to create a first holographic image in front of the first display area; and at least one photodetector configured to collect first gesture information about a first gesture though which the first holograph image is controlled by a viewer. The processor is further configured to generate a first control signal according to the first gesture information, and re-modulate the laser beam to be emitted from the laser projector, so as to create a second holographic image corresponding to the first control signal.

In some embodiments, the at least one photodetector is integrated at an edge of the first display area, and each of the at least one photodetector is further configured to collect luminance of pixel light at a position in an image displayed in the first display area adjacent to a corresponding photodetector and/or luminance of the laser beam emitted from the laser projector, for correcting background light.

In some embodiments, the at least one photodetector comprises at least two photodetectors.

In some embodiments, the at least two photodetectors are distributed at two edges of the first display area respectively disposed on both sides of a horizontal line of sight of human eyes.

In some embodiments, the laser projector comprises: a laser disposed at a back side of the display screen; a fiber optic splitter connected to the laser; and two laser output ports on a frame of the display screen and disposed at two sides of the first display area along a horizontal line of sight of the human eyes respectively. The modulated laser beam emitted from the laser is split by the fiber optic splitter into two laser beams having coherence, which are then emitted via the laser output ports respectively, and an overlap area of the two laser beams in front of the first display area is a holographic display area.

In some embodiments, there is a preset angle between a central axis of each of the laser output ports and a plane where the first display area is located, and the preset angle is $\alpha$, which is greater than or equal to Arctan(D/H) and is smaller than or equal to Arctan(2D/H), where D is a diagonal length of the first display area, and H is a length of the first display area parallel to a horizontal line of sight of human eyes.

In some embodiments, the laser is a green semiconductor laser having an output wavelength of 532 nm.

In some embodiments, the first gesture information is information that represents a movement of a finger to a left front of the viewer's line of sight, and the first control signal is a signal that represents a movement of the first holographic image to a left. The first gesture information is information that represents a movement of the finger to a right front of the viewer's line of sight, and the first control signal is a signal that represents a movement of the first holographic image to a right. The first gesture information is information that represents a clockwise rotation of the finger, and the first control signal is a signal that represents a clockwise rotation of the first holographic image. The first gesture information is information that represents a counterclockwise rotation of the finger, and the first control signal is a signal that represents a counterclockwise rotation of the first holographic image. The first gesture information is hand-sliding information, the first control signal is a rotation signal of the first holographic image, and a sliding degree is proportional to a rotation angle.

In some embodiments, in a case where the laser projector is not activated, the at least one photodetector is configured to collect second gesture information of a second gesture through which the viewer controls an image displayed in the first display area. In addition, the processor is configured to generate a second control signal according to the second gesture information, and process a received display signal to generate a processed display signal, so that an image corresponding to the processed display signal is displayed in the first display area.

In some embodiments, the at least one photodetector is integrated at an edge of the first display area, and each of the at least one photodetector is further configured to collect luminance of pixel light in the image displayed in the first display area adjacent to a corresponding photodetector, for correcting background light.

BRIEF DESCRIPTION OF THE DRAWINGS

The accompanying drawings described herein are used to provide a further understanding of the present disclosure and constitute a part of the present disclosure. The illustrative embodiments of the present disclosure and the descriptions thereof serve to explain the present disclosure, but do not constitute an improper limitation to the present disclosure. In the accompanying drawings.

DETAILED DESCRIPTION

Figure 1:
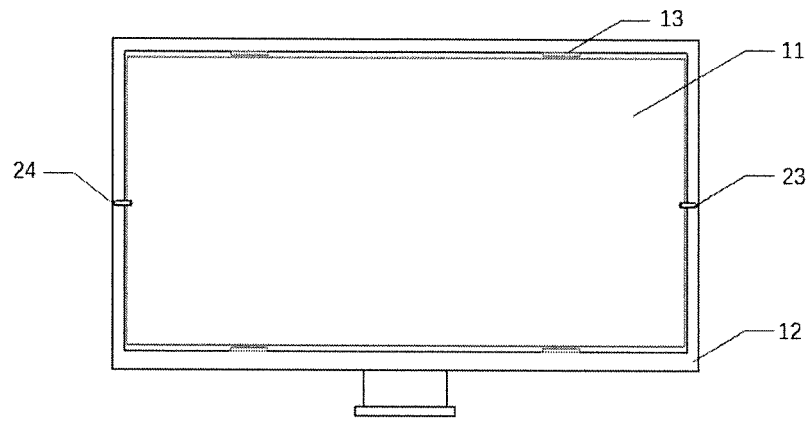
FIG. 1 is a schematic structural diagram of a display system according to some embodiments of the present disclosure.

Technical solutions in embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

It will be noted that unless otherwise defined, all terms (including technical and scientific terms) used in the embodiments of the present disclosure have the same meanings as common understandings of a person of ordinary skill in the art. It will also be understood that terms such as those defined in the ordinary dictionary should be construed as the meanings consistent with the meanings in the context of the related art, and should not be explained by an idealized or extremely formal meaning, unless explicitly defined here.

For example, the terms "first", "second" and similar terms used in the specification and claims of the present disclosure do not denote any order, quantity or importance, and are merely used to distinguish different components. The words "including" or "comprising" and the like mean that the elements or objects appearing before the words cover or are equivalent to the elements or objects appearing after the words, without excluding other elements or objects. Orientations or positional relationships indicated by terms "front", "rear" and the like are based on orientations or positional relationships shown in the drawings, merely to facilitate and simplify the description of the technical solution of the present disclosure, but not to indicate or imply that the referred devices or elements must have a particular orientation, or must be constructed or operated in a particular orientation. Therefore they should not be construed as limitations to the present disclosure.

Augmented Reality (AR) technology is a technology of augmenting the reality of virtual information. For example, the AR technology combines the real environment and a virtual object in real time and presents them in the same image, and the virtual object is displayed as a stereoscopic image, i.e., a virtual three-dimensional image of the object, in a space through the holographic projection technology, so that a viewer obtains a more realistic and stereoscopic sense than the two-dimensional image, thereby enhancing the viewer's realistic feeling.

Some embodiments of the present disclosure provide a display system, and the display system includes a display screen, a processor, a laser projector and at least one photodetector. The display screen has a first display area. The processor is configured to modulate a laser beam to be emitted from the laser projector according to a pre-stored holographic image data source to obtain a modulated laser beam. The laser projector is configured to project the modulated laser beam to create a first holographic image in front of the first display area. The at least one photodetector is configured to collect first gesture information about a first gesture of a viewer, through which the first holographic image is controlled by the viewer. The processor is further configured to generate a first control signal according to the first gesture information, and re-modulate the laser beam to be emitted from the laser projector, so as to create a second holographic image corresponding to the first control signal.

The image displayed on the display screen is for example a two-dimensional image. In some embodiments, the image displayed on the display screen is used as a background image of the holographic image when it is displayed. For example, when a frontal holographic image of a vase is created in front of the first display area, the rear display screen can display a two-dimensional image of an exhibition hall or a museum, giving the viewer an immersive experience in the exhibition hall or museum.

Here, the "front" in the above embodiments refers to the front of the image displayed in the first display area, that is, a side of the display screen for the viewer to view the image.

In some embodiments, each of the at least one photodetector includes an emitter configured to emit probe light (typically infrared light) and a receiver configured to receive reflected light. The motion trajectories of a hand of the viewer with different gestures can be determined based on paths along which the reflected light is reflected back to the receiver.

In some other embodiments, each of the at least one photodetector further includes an imager such as a camera, or a charge coupled device element (CCD), and an image processor. Gesture recognition can be achieved by imaging the hand and then processing the image by using a stereo vision algorithm. The stereo vision algorithm is example a monocular stereo vision algorithm, a binocular stereo vision algorithm or a multi-view stereo vision algorithm. Here, the binocular stereo vision algorithm is taken as an example. The at least one photodetector includes two photodetectors, which are similar to the human eyes, and can be used to calculate the specific three-dimensional position of the hand by the parallax principle in real time, to locate, in real time, the position where the viewer's hand is located to obtain the motion trajectory of the hand, thereby achieving gesture recognition.

The connection between the at least one photodetector and the processor is achieved by for example a wired connection or a wireless (e.g., WIFI) connection.

The holographic image data source pre-stored in the processor is for example holographic digital plate data or holographic image plate data, which is not limited in the present disclosure.

In some embodiments, the holographic image data source pre-stored in the processor includes 360-degree omni-directional information of an object, such as information of a 360-degree full view of the above vase.

The processor is configured to modulate a laser beam (i.e., the output signal) to be emitted from the laser projector according to the pre-stored holographic image data source, so as to create a corresponding holographic image, such as a frontal appearance of the above vase, in front of the first display area, so that the viewer may obtain the same visual effect, which includes actual parallaxes at all locations of the object, as that obtained when the viewer views the actual original object.

The connection between the at least one processor and the laser projector is achieved by for example a wired connection or a wireless (e.g., WIFI) connection.

When sliding gesture information of a sliding gesture is collected by the photodetector, the processor invokes the pre-stored holographic image data source, generates a rotation signal according to the sliding gesture information and remodulates the laser beam to be emitted from the laser projector, so that laser projector projects the remodulated laser beam to create a holographic image of the vase after being rotated. Therefore, the viewer further obtains a full view of the vase, thereby displaying the holographic image of the object at different angles and achieving the interaction between the viewer and the created holographic image.

As the extent of sliding of the sliding gesture (that is, a sliding distance of the sliding gesture) becomes larger, the rotation angle of the holographic image will also become larger, so that the viewer may view the appearance of the object in all directions.

Here, the first control signal generated by the processor is for example a voltage signal or a current signal, which is not limited herein.

The at least one photodetector includes for example a single photodetector, or two or more photodetectors, which is not limited herein.

In the above display system provided by the embodiments of the present disclosure, the display screen display technology, the holographic projection technology and the gesture recognition technology are used, which may bring a new sensory experience to the viewer. On the basis of the traditional two-dimensional display image, the holographic image is added in front of the background image, and by using the gesture recognition technology, the display system has the function of human-computer interaction, thereby enhancing the visual experience of the viewer.

Figure 2:
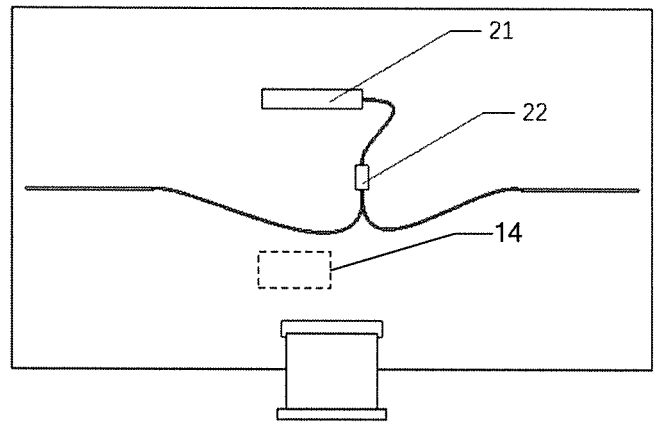
FIG. 2 is a schematic structural diagram of another display system according to some embodiments of the present disclosure.
Figure 3:
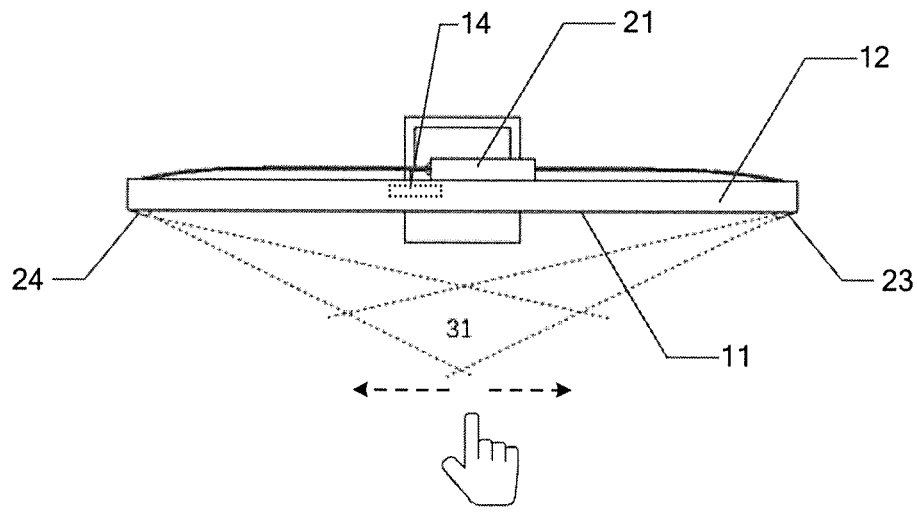
FIG. 3 is a schematic diagram showing a location of a holographic display area according to some embodiments of the present disclosure.

In some embodiments, the correspondence between the gesture information and the control signal is pre-written in a program in the processor 14 (which is for example integrated in a host of the display screen, as shown in FIGS. 2 and 3) connected to the at least one photodetector, that is, the gesture trajectories are defined in advance.

For example, the gesture trajectories are defined as below. As shown in FIG. 3, the movement of the finger to the viewer's left line of sight indicates that the first holographic image translates to the left, and the movement of the finger to the viewer's right line of sight indicates that the first holographic image translates to the right, thereby achieving the left and the right movement of the first holographic image. The clockwise rotation of the finger indicates that the first holographic image rotates clockwise, and the counterclockwise rotation of the finger indicates that the first holographic image rotates counterclockwise. The hand sliding indicates that the holographic image rotates, and the sliding distance is proportional to the rotation angle, that is, the farther the sliding distance, the larger the rotation angle. The specific gesture instructions can be flexibly adjusted according to the actual needs in use, which is not limited herein.

The at least one photodetector is for example disposed on the frame around the display screen. In order to improve the integration degree of the display screen and further make the overall structure of the display screen thinner, in some embodiments, the at least one photodetector is integrated at the edge of the first display area by using, for example, a semiconductor thin film process, that is, the photodetector is embedded in the display screen, thereby fully utilizing the existing preparation processes of display products.

Since the at least one photodetector is integrated at the edge of the first display area, and the holographic image created is located in front of the first display area, the photodetector is easily affected by the pixel light of the first display area and/or the laser beam projected by the laser projector when the gesture recognition is performed. In order to improve the accuracy of the gesture recognition, in some embodiments, each of the at least one photodetector is further configured to collect luminance of pixel light in the image displayed in the first display area adjacent to the photodetector and/or luminance of the laser beam emitted from the laser projector, for correcting the background light.

The background light described above refers to the background noise of the photodetector, including pixel light in the image displayed in the first display area adjacent to the photodetector and/or the laser beam emitted from the laser projector. When the photodetector performs gesture recognition, it is necessary to eliminate the interference caused by the pixel light and/or the laser beam, and the detection accuracy of the photodetector may be improved by actively eliminating the interference caused by the luminance of the light of the pixels adjacent to photodetector and/or the luminance of the laser beam emitted from the laser projector.

Here, when a circuit board (control circuit) in the display screen inputs a signal for displaying an image, input voltage signals are in one-to-one correspondence with the luminance of the light of the pixels. For example, the at least one photodetector is connected to the circuit board in the display screen to obtain the luminance of the light of the pixels in the image displayed in the first display area adjacent to the at least one photodetector.

In some embodiments, the detection principle of the photodetector is to emit the probe light and receive the reflected light of the object in different directions, and a receiver is added in the photodetector to collect the luminance of the laser beam emitted from the laser projector.

Considering that when the at least one photodetectors includes a single photodetector, only the up, down, left and right orientations of the viewer's hand can be sensed, and the positioning effect cannot be achieved, that is, the distance from the hand to the display screen cannot be calculated. In addition, the gestures that can be recognized are limited, and the technology cannot be applied in complex gesture recognitions such as rotation, sliding, etc. In order to avoid this problem, in some embodiments, as shown in FIG. 1, the at least one photodetector 13 includes at least two photodetectors.

In some embodiments, referring to FIG. 1, the at least two photodetectors 13 are distributed at the upper and lower edges of the first display area 11 of the display screen 12 which are respectively disposed on two sides of the horizontal line of sight of the human eyes, to more accurately acquire the information about the gesture of the viewer in front of the display screen 12.

In some embodiments, the at least one photodetector 13 includes an even number of photodetectors which are symmetrically distributed at the upper and lower edges of the first display area 11 of the display screen 12 which are respectively disposed on two sides of the horizontal line of sight of the human eyes.

In some embodiments, as shown in FIG. 2, the laser projector includes a laser 21, a fiber optic splitter 22 and two laser output ports 23 and 24. The laser 21 is disposed on a back side of the display screen 12, that is, a side of the display screen 12 facing away from the first display area 11. The fiber optic splitter 22 is connected to the laser 21. Referring to FIG. 2, the laser output ports 23 and 24 are disposed on a frame of the display screen 12, and they are disposed respectively at two sides of the first display area 11 along the horizontal line of sight of the human eyes. As shown in FIG. 3, the laser beam emitted from the laser 21 is split by the fiber optic splitter 22 into two laser beams having a coherence, which are then emitted via the laser output ports respectively, and an overlap area of the two laser beams (shown by the dotted lines in the FIG. 3) in front of the first display area 11 is a holographic display area 31.

In the above embodiments, the laser beams emitted from the laser 21 can be recognized by the human eyes as long as theirs wavelengths are within the wavelength range of visible light. For example, the laser 21 is a green semiconductor laser having an output wavelength of 532 nm. The laser 21 and the fiber optic splitter 22 are connected for example through an optical fiber or the like. Moreover, the specific structure and the specific principle of the two laser beams having coherence to achieve a holographic projection have been well known to a person skilled in the art and will not be elaborated here.

In some embodiments, the frame of the display screen is made of for example a plastic material having a low density and thus is easy to process, thereby facilitating the formation of the two laser output ports 23 and 24.

There is a certain angle between a central axis of each of the laser output ports and the plane where the first display area is located, and a range of the angle is related to position and size of the holographic image.

Figure 4:
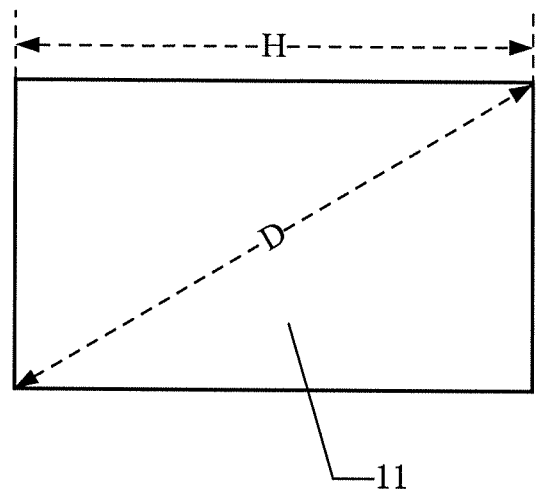
FIG. 4 is a schematic diagram showing dimensions of a first display area in a display system according to some embodiments of the present disclosure.
Figure 5:
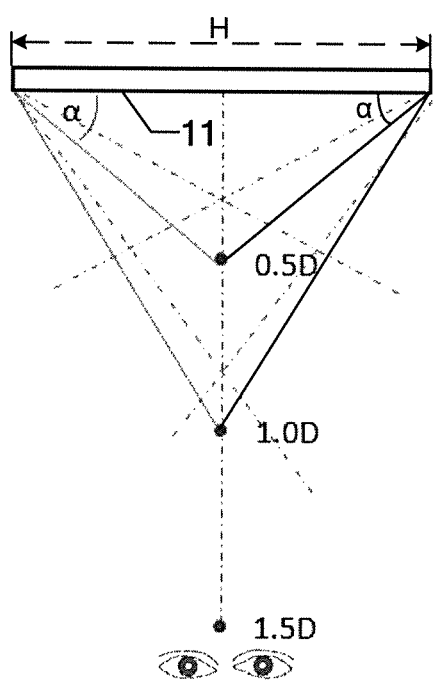
FIG. 5 is a schematic diagram showing an angle between a central axis of each of laser output ports and a plane where a first display area is located in a display system according to some embodiments of the present disclosure.

As shown in FIG. 4, a diagonal length of the first display area 11 is D, and as shown in FIG. 5, a length of the first display area 11 parallel to the horizontal line of sight of the human eyes is H. In order to ensure the viewing comfort of the human eyes, the optimal viewing distance L from the display screen (that is, the optimal distance between the viewer and the display screen) is (1.5×D), that is, one and a half times D, and correspondingly, the created holographic image will be 1/3 L~2/3 L directly in front of the display screen, that is, the created holographic image will be 0.5D~1D directly in front of the display screen, so that the created holographic image is located between the display screen and the viewer, and the gesture of the viewer is prevented from appearing in the holographic display area 31, thereby avoiding affecting the accuracy of gesture recognition.

According to the above design needs, as shown in FIG. 5, the angle α between the central axis of each of the laser output ports and the plane where the first display area is located satisfies the following conditions:

$$\text{Arctan}\frac{D}{H} \le \alpha \le \text{Arctan}\frac{2D}{H}$$

It will be noted that the central axis of each of the laser output ports refers to an axis perpendicular to the plane where a corresponding laser output port is located and passing through the center of the laser output port.

In some embodiments, in the case where the laser projector is not activated, the at least one photodetector is also configured to collect second gesture information about a second gesture of the viewer, though which the viewer controls the image displayed in the first display area, and the processor is also configured to generate a second control signal according to the second gesture information, and process a received external display signal based on the second control signal, so that an image corresponding to the processed display signal is displayed in the first display area. Thus, the human-computer interaction between the viewer and the display screen may be achieved.

The second control signal is for example used for controlling a two-dimensional image displayed in the first display area to be rotated, reduced or enlarged in a plane, or doing other operations.

The at least one photodetector is integrated at the edge of the first display area, thereby fully utilizing the existing preparation processes of display products. Similarly, in order to improve the accuracy of gesture recognition of the human-computer interaction between the viewer and the display screen, each of the at least one photoelectric detector is further configured to collect luminance of pixel light in the image displayed in the first display area adjacent to the photodetector, for correcting background light. Thus, the detection accuracy of the second gesture information by the at least one photodetector may be improved.

It will be noted that a person skilled in the art can understand that all or part of the steps of implementing the above embodiments may be completed by hardware related to program instructions, and the foregoing program may be stored in a computer readable storage medium, and during performance, the program performs the steps including those in the above method embodiments; and the foregoing storage medium includes, but is not limited to, a read-only memory (ROM), a random access memory (RAM), a magnetic disk or an optical disk and the like, which can store program codes.

In the descriptions of the above embodiments, specific features, structures, materials or characteristics may be combined in any suitable manner in any one or more embodiments or examples.

The foregoing descriptions are merely some implementation manners of the present disclosure, but the protection scope of the present disclosure is not limited thereto, and the changes or replacements that any person skilled in the art can easily think of in the technical scope disclosed by the present disclosure should be within the protection scope of the present disclosure. Therefore, the protection scope of the present disclosure shall be subject to the protection scope of the claims.

What is claimed is:

1. A display system, comprising:
   a display screen having a first display area;
   a processor including a pre-stored holographic image data source, wherein the pre-stored holographic image data source includes 360-degree omni-directional information of an object, and the processor is configured to invoke a first holographic image of a certain object from the pre-stored holographic image data source and modulate a laser beam to obtain a first modulated laser beam which is corresponding to the first holographic image;
   a laser projector configured to project the first modulated laser beam to create the first holographic image in front of the first display area; and
   at least one photodetector configured to collect first gesture information about a first gesture through which the first holographic image is controlled by a viewer, wherein
   the processor is further configured to generate a first control signal based on the first gesture information, invoke a second holographic image of the certain object corresponding the first control signal from the pre-stored holographic image data source, and modulate a laser beam to obtain a second modulated laser beam which is corresponding to the second holographic image so as to create the second holographic image corresponding to the first control signal through the laser projector in front of the first display area; and
   the laser projector comprises:
   a laser disposed at a back side of the display screen;
   a fiber optic splitter connected to the laser; and two laser output ports disposed on a frame of the display screen and disposed at two sides of the first display area along a horizontal line of sight of the human eyes respectively, and wherein the modulated laser beam emitted from the laser is split by the fiber optic splitter into two laser beams having coherence, which are then emitted via the laser output ports respectively, and an overlap area of the two laser beams in front of the first display area is a holographic display area;

there is a preset angle between a central axis of each of the laser output ports and a plane where the first display area is located, and the preset angle is α, which is greater than or equal to Arctan(D/H) and is smaller than or equal to Arctan(2D/H), where D is a diagonal length of the first display area, and H is a length of the first display area parallel to a horizontal line of sight of human eyes, wherein the display screen is configured to display a background image corresponding the first holographic image or the second holographic image; and the display system is configured to display the background image and the first holographic image, or display the background image and the second holographic image.

2. The display system according to claim 1, wherein, the at least one photodetector is integrated at an edge of the first display area; and each of the at least one photodetector is further configured to:

collect luminance of pixel light at a position in an image displayed in the first display area adjacent to a corresponding photodetector and/or luminance of the laser beam emitted from the laser projector, for correcting background light.

3. The display system according to claim 2, wherein, the at least one photodetector comprises at least two photodetectors.

4. The display system according to claim 3, wherein, the at least two photodetectors are distributed at two edges of the first display area respectively disposed on both sides of a horizontal line of sight of human eyes.

5. The display system according to claim 1, wherein, the laser is a green semiconductor laser having an output wavelength of 532 nm.

6. The display system according to claim 1, wherein, the first gesture information is information that represents a movement of a finger to a left front of the viewer's line of sight, and the first control signal is a signal that represents a movement of the certain object with the first holographic image to a left, after that the second holographic image is obtained; or the first gesture information is information that represents a movement of the finger to a right front of the viewer's line of sight, and the first control signal is a signal that represents a movement of the certain object with the first holographic image to a right, after that the second holographic image is obtained; or the first gesture information is information that represents a clockwise rotation of the finger, and the first control signal is a signal that represents a clockwise rotation of the certain object with the first holographic image, after that the second holographic image is obtained; or the first gesture information is information that represents a counterclockwise rotation of the finger, and the first control signal is a signal that represents a counterclockwise rotation of the certain object with the first holographic image, after that the second holographic image is obtained; or the first gesture information is hand-sliding information, the first control signal is a rotation signal of the certain object with the first holographic image, and a sliding degree is proportional to a rotation angle, after that the second holographic image is obtained.

7. The display system according to claim 1, wherein, in a case where the laser projector is not activated, the at least one photodetector is configured to collect second gesture information of a second gesture, through which the viewer controls an image displayed in the first display area;

the processor is configured to generate a second control signal according to the second gesture information, and process a received display signal to generate a processed display signal, so that an image corresponding to the processed display signal is displayed in the first display area.

8. The display system according to claim 7, wherein, the at least one photodetector is integrated at an edge of the first display area; and each of the at least one photodetector is further configured to:

collect luminance of pixel light in the image displayed in the first display area adjacent to a corresponding photodetector, for correcting background light.

\* \* \* \* \*